United States Patent
Zheng et al.

(10) Patent No.: US 10,754,127 B2
(45) Date of Patent: Aug. 25, 2020

(54) MICRO-OBJECTIVE LENS AND HIGH-RESOLUTION BROADBAND IMAGING SYSTEM WITH SUCH MICRO-OBJECTIVE LENS

(71) Applicant: ZHEJIANG UNIVERSITY, Hangzhou, Zhejiang Province (CN)

(72) Inventors: Zhenrong Zheng, Hangzhou (CN); Xiao Tao, Hangzhou (CN); Wentao Zhang, Hangzhou (CN); Chenning Tao, Hangzhou (CN); Haifeng Li, Hangzhou (CN); Xu Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 134 days.

(21) Appl. No.: 16/091,954

(22) PCT Filed: Jan. 25, 2018

(86) PCT No.: PCT/CN2018/074080
§ 371 (c)(1),
(2) Date: Oct. 5, 2018

(87) PCT Pub. No.: WO2018/157683
PCT Pub. Date: Sep. 7, 2018

(65) Prior Publication Data
US 2019/0162933 A1  May 30, 2019

(30) Foreign Application Priority Data
Feb. 28, 2017  (CN) .......................... 2017 1 0113001

(51) Int. Cl.
*G02B 9/64* (2006.01)
*G02B 21/04* (2006.01)
(Continued)

(52) U.S. Cl.
CPC ............ *G02B 9/64* (2013.01); *G02B 13/005* (2013.01); *G02B 21/0076* (2013.01);
(Continued)

(58) Field of Classification Search
CPC ...... G02B 21/24; G02B 21/02; G02B 21/365; G02B 21/0012; G02B 21/0076;
(Continued)

(56) References Cited

U.S. PATENT DOCUMENTS 5,583,698 A * 12/1996 Yamada ............... G02B 15/173
359/687
RE40,582 E * 11/2008 Ishii ..................... G02B 15/173
359/683
(Continued)

*Primary Examiner* — Collin X Beatty
*Assistant Examiner* — Grant A Gagnon
(74) *Attorney, Agent, or Firm* — Jiwen Chen; Jacobson Holman PLLC

(57) ABSTRACT

The present invention discloses a micro-objective lens, comprising the first lens group, the second lens group, the third lens group, the fourth lens group, the fifth lens group, the sixth lens group, the seventh lens group, the eighth lens group, the ninth lens group and the tenth lens group with optical axis arranged in a sequence from the left to the right; the focal length of the first lens group is negative; the second lens group belongs to doublet, in which the focal length of the first and second lens is positive and negative respectively; the focal length of the third lens group is positive; the fourth and fifth lens groups belongs to doublets, in which the focal length of the first and second lens in each group is negative and positive respectively; the focal length of the sixth lens group is positive; the focal length of the seventh and eighth lens groups is negative; the focal length of the ninth and tenth lens groups is positive. The present invention also discloses a high-resolution broadband imaging system with aforesaid micro-objective lens.

9 Claims, 2 Drawing Sheets

(51) Int. Cl.
    *G02B 13/00*     (2006.01)
    *G02B 21/00*     (2006.01)
    *G02B 21/02*     (2006.01)
    *G02B 21/16*     (2006.01)

(52) U.S. Cl.
    CPC .............. *G02B 21/02* (2013.01); *G02B 21/04* (2013.01); *G02B 21/16* (2013.01)

(58) Field of Classification Search
    CPC ........ G02B 21/16; G02B 21/00; G02B 21/06; G02B 21/26; G02B 21/367; G02B 21/0008; G02B 21/34; G02B 21/0016; G02B 21/0032; G02B 21/0088; G02B 21/241; G02B 21/248; G02B 21/33; G02B 21/04; G02B 21/362; G02B 21/002; G02B 21/0044; G02B 21/0072; G02B 21/082; G02B 21/18; G02B 21/361; G02B 27/0006; G02B 27/0025; G02B 27/0075; G02B 7/001; G02B 13/22; G02B 21/0004; G02B 21/008; G02B 21/025; G02B 21/14; G02B 21/244; G02B 21/245; G02B 21/36; G02B 21/368; G02B 25/001; G02B 26/06; G02B 27/58; G02B 3/0087; G02B 7/003; G02B 7/021; G02B 7/023; G02B 7/36; G02B 13/14; G02B 15/173; G02B 17/008; G02B 17/026; G02B 17/06; G02B 17/0896; G02B 1/002; G02B 1/02; G02B 21/0024; G02B 21/004; G02B 21/006; G02B 21/0092; G02B 21/08; G02B 21/086; G02B 21/20; G02B 21/28; G02B 23/12; G02B 23/2423; G02B 23/2438; G02B 23/2453; G02B 23/2461; G02B 23/2469; G02B 23/2476; G02B 25/007; G02B 26/008; G02B 26/105; G02B 26/108; G02B 27/0062; G02B 27/0994; G02B 27/126; G02B 27/283; G02B 27/286; G02B 27/4205; G02B 27/4211; G02B 27/52; G02B 3/0012; G02B 3/0056; G02B 3/14; G02B 5/005; G02B 5/20; G02B 5/3083; G02B 6/02009; G02B 6/02314; G02B 6/262; G02B 6/32; G02B 6/3624; G02B 6/3636; G02B 6/3652; G02B 6/3672; G02B 6/385; G02B 6/3866; G02B 6/3885; G02B 7/00; G02B 7/006; G02B 7/008; G02B 7/022; G02B 7/027; G02B 7/14; G02B 7/16; G02B 7/24; G02B 7/38; G02B 9/10; G02B 9/14

USPC ........................................................ 359/368
See application file for complete search history.

(56) References Cited

U.S. PATENT DOCUMENTS

2002/0063970 A1*   5/2002   Uzawa ................ G02B 15/173
                                                                     359/689
2013/0050535 A1*   2/2013   Kuroda ................ G02B 15/173
                                                                       348/240.3

* cited by examiner

MICRO-OBJECTIVE LENS AND HIGH-RESOLUTION BROADBAND IMAGING SYSTEM WITH SUCH MICRO-OBJECTIVE LENS

This is a U.S. national stage application of PCT Application No. PCT/CN2018/074080 under 35 U.S.C. 371, filed Jan. 25, 2018 in Chinese, claiming priority of Chinese Application No. 201710113001.0, filed Feb. 28, 2017, all of which are hereby incorporated by reference.

FIELD OF THE INVENTION

The present invention is related to the technical field of optical microscopy, in particular to a micro-objective lens and a high-resolution broadband imaging system with such micro-objective lens.

BACKGROUND ARTS

Accompanied by development of sciences and technologies, people are in increasing pursuit of more extensive field of view and higher resolution. This is especially important in the micro-imaging field. A good structure of objective lens has tremendous influence on micro-imaging effect.

A common micro-objective lens is inadequate to ensure both field of view and resolution; whereas, improvement of imaging quality is extremely important to the whole microscopic system. The resolution of microscopic system is mainly determined by the diffraction limit of objective lens. Therefore, design of objective lens is a critical part of the whole microscopic system.

Numerical aperture of the micro-objective lens is an important optical parameter of a microscope. As indicated by Rayleigh criterion, resolution of microscopic system can be represented by $\sigma=0.61\lambda/NA$; wherein, $\lambda$ refers to optical wavelength; NA refers to numerical aperture; light of short wavelength can improve resolution of the microscopic system. To improve resolution of the microscopic system under the light of the same wavelength, it is necessary to increase numerical aperture (NA). Numerical aperture of microscope can be represented by $NA=n \sin \alpha$. On this account, it is applicable to use oil immersion objective lens to increase numerical aperture value. However, this may make it more difficult for application. Furthermore, numerical aperture of objective lens is determined by the correction of aberration to the optical system to a great extent. We often use fluorite lens of low refraction and low chromatic dispersion to improve color difference and imaging quality of the lens.

Presently, optical microscope plays an important role in numerous fields, such as biomedicine. In the $20^{th}$ century, resolution of optical microscope was up to nano scale. Nowadays, there are increasing demands for observation within extensive field of view, especially observation under fluorescence of extensive field of view of microscope. Furthermore, expansion of field of view of micro-objective lens and improvement of resolution serve as the critical link for design of micro-objective lens in the future.

SUMMARY OF THE INVENTION

The present invention provides a micro-objective lens and a high-resolution broadband imaging system thereof. This aims to ensure observation under in different lighting modes with the help of micro-objective lens through design of optical system and improvement of lighting devices so as to improve resolution, and expand application scope of micro-objective lens.

Technical solutions as used by the present invention to solve relevant technical problems are stated as follows:

A micro-objective lens, comprising the first lens group, the second lens group, the third lens group, the fourth lens group, the fifth lens group, the sixth lens group, the seventh lens group, the eighth lens group, the ninth lens group and the tenth lens group with optical axis arranged in a sequence from the left to the right.

The micro-objective lens make use of ten groups of thirteen spherical lenses; the ten lens groups include the first lens group, the second lens group, the third lens group, the fourth lens group, the fifth lens group, the sixth lens group, the seventh lens group, the eighth lens group, the ninth lens group and the tenth lens group. The first through-fifth lens groups are in the form of combined positive lenses and doublets to obtain long focus and short working distance for front shifting of principal plane of the system. The focal length of the first lens group is negative. The second lens group belongs to doublet, in which the focal length of the first and second lens is positive and negative respectively. The focal length of the third lens group is positive. The fourth and fifth lens groups belong to doublets, in which the focal length of the first and second lens in each group is negative and positive respectively. The sixth-tenth lens groups make use of numerous doublets and high Abbe number lenses to correct color difference to broad band, and extend rear working distance of the system. The focal length of the sixth lens group is positive; the focal length of the seventh and eighth lens groups is negative; the focal length of the ninth and tenth lens groups is positive.

The first lens group is made of H-ZF52A, of which radius of front surface and rear surface is −17.039 mm and −21.8 mm, respectively, with thickness up to 6.3 mm. The second lens group is formed by two lenses through gluing, which is made of H-ZF52A and H-LAK3 respectively. The radius of front and rear surfaces of the first lens is −114.485 mm and −26.89 mm, respectively, with thickness up to 10.5 mm. The radius of rear surface of the second lens is −52.986 mm with thickness up to 3.1 mm. The third lens group is made of H-ZF52A, of which radius of front and rear surfaces is 55.534 mm and −122 mm respectively with thickness up to 29.9 mm. The fourth and fifth lens groups belong to doublets, which are made of H-ZF7LA and H-ZBAF3. The radius of front and rear surfaces of the first lens in the fourth lens group is −89.2 mm and 24.21 mm, respectively, with thickness up to 25 mm. The radius of rear surface of the second lens is −36.85 mm with thickness up to 10.4 mm. The radius of front and rear surfaces of the first lens in the fifth lens group is −32.214 mm and 30.2 mm, respectively, with thickness up to 2.5 mm. The radius of rear surface of the second lens is −89.77 mm with thickness up to 7.3 mm. The sixth lens group is made of H-ZBAF5, of which radius of front and rear surfaces is 44.253 mm and −50.35 mm, respectively, with thickness of lens up to 19.8 mm. The seventh lens group is made of H-F2, of which radius of front and rear surfaces is −38.68 mm and 336.84 mm with thickness up to 25 mm. The eighth lens group is made of H-LAK3, of which radius of front and rear surfaces is −26.42 mm and −222.59 mm, respectively, with thickness up to 4 mm. The ninth lens group is made of ZF5, of which radius of front and rear surfaces is −150.714 mm and −69.98 mm, respectively, with thickness up to 15.6 mm. The tenth lens group is made of H-ZBAF5, of which radius of front and rear surfaces is 3200 mm and −174.5 mm with thickness up to 13.25 mm.

The micro-objective further comprises an aperture stop located at the point 0.5 mm in front of the sixth lens group.

The present invention further provides a high-resolution broadband imaging system, a light source, a micro-objective lens, a spectroscope group and a reflector group. The micro-objective lens, spectroscope group and reflector group are on the same optical axis to form a curved image surface.

The micro-objective lens has the first lens group, the second lens group, the third lens group, the fourth lens group, the fifth lens group, the sixth lens group, the seventh lens group, the eighth lens group, the ninth lens group and the tenth lens group with optical axis arranged in a sequence from the left to the right; the focal length of the first lens group is negative; the second lens group belongs to doublet, in which the focal length of the first and second lens is positive and negative respectively; the focal length of the third lens group is positive; the fourth and fifth lens groups belongs to doublets, in which the focal length of the first and second lens in each group is negative and positive respectively; the focal length of the sixth lens group is positive; the focal length of the seventh and eighth lens groups is negative; the focal length of the ninth and tenth lens groups is positive.

In a preferred embodiment, the first-fifth lens groups are in the form of combined positive lenses and doublets to obtain long focus and short working distance for front shifting of principal plane of the system; the sixth-tenth lens groups make use of numerous doublets and high Abbe number lenses to correct color difference to broad band.

In a preferred embodiment, magnification power of the imaging micro-objective lens is 35 with numerical aperture up to 0.3.

In a preferred embodiment, the spectroscope group comprises a half transparent and half reflecting lens and a dichroscope.

In a preferred embodiment, the included angle between the half transparent and half reflecting lens and optical axis is 45°, the included angle between the dichroscope and optical axis is 45°; the two moves via the mechanical guide device.

In a preferred embodiment, the included angle between the reflecting lens group and optical axis is 45°, which enables the light path of the system to turn by 90°

In a preferred embodiment, the curved image and reflector group are located on the same optical axis, which are vertical to the optical axis where the micro-objective lens is located; radius of the curved image is 2016 mm.

The present invention mainly comprises a microscopic optical system formed by ten lens groups; the ten lens groups are arranged in a sequence from the left to the right along the optical axis; wherein, the second, the fourth and the fifth lens groups belong to doublets; color difference to samples to be tested will be eliminated by aforesaid high-resolution broadband microscopic system prior to precise amplification and imaging.

The light splitter is formed by two flat lenses plated with different films; wherein, one is half transparent and half reflecting flat lens; the half transparent and half reflecting lens receives light from light source; 50% light is reflected, and remaining 50% light penetrates through the microscopic system to provide lighting for samples to be tested. The half transparent and half reflecting lens can ensure appropriate intensity of light coming into the optical system to facilitate observation of image of samples. Another one is dichroscope, used for fluorescence imaging. The dichroscope has high reflectance to the light of long excitation light wave and higher transmittance to light from fluorescence wave as sent by the specimen; it plays an important role in reflecting excitation light and transmitting fluorescence. Green light with wavelength up to 555 nm is selected herein. Excitation beam passing through the flat lens plated with dichroic film and aforesaid microscopic system will penetrate the specimen to excite fluorescence; subjecting to amplification by aforesaid micro-objective lens system, induced fluorescence will form image on aforesaid dichroscope. In this way, a fluorescence image of uniform visual lighting and high imaging clarity is to be obtained. It is applicable to select a piece of glaze for empirical observation of the two flat lenses based on transverse shift of mechanical device.

Turning of light path of the system is to be accomplished by a piece of flat reflector. The flat reflector will not bring forth any aberration, which can ensure high imaging clarity of the micro-objective optical system.

Numerical aperture, working distance, amplification power, working wavelength of high-resolution broadband micro-objective lens is 0.3, 20 mm, 35 and 460-650 nm respectively; overall focal distance of the system is 57 mm.

The light splitter comprises a half transparent and half reflecting lens and a dichroscope. The half transparent and half reflecting lens forms an included angle of 45° with the optical axis, which can receive full-wave band of visible light. It aims to reduce the intensity of light from light source to enable observer to observe specimen clearly at appropriate intensity. The dichroscope forms an included angle of 45° with the optical axis, of which beam split wavelength is 555 nm. It aims to make the fluorescent material to send fluorescence to enable observer to observe the fluorescence image clearly. It is applicable to select the two light splitters according to different demands. They are available for transverse shift with the help of mechanical device.

The high-resolution micro-objective optical system will eventually form a curved image surface to effectively reduce the aberration to the system.

The present invention aims to cater to both extensive field of view of imaging system and high-resolution imaging of micro-objective lens, which makes use of micro-objective lens of extensive field of view to realize wide field of view The field of view of the whole micro-objective lens as realized exceeds conventional electro-optical imaging system by two orders of magnitude with imaging resolution up to 100M pixels.

The present invention features in uniform full-field resolution, which has solved the problem with improvement of system resolution in wide field of existing imaging micro-objective lens. As a result of it, wide-field imaging quality of the whole micro-objective lens system can be up to diffraction limit.

PREFERRED EMBODIMENTS

The present invention is further described as follows in combination with drawings and embodiments.

Figure 1:
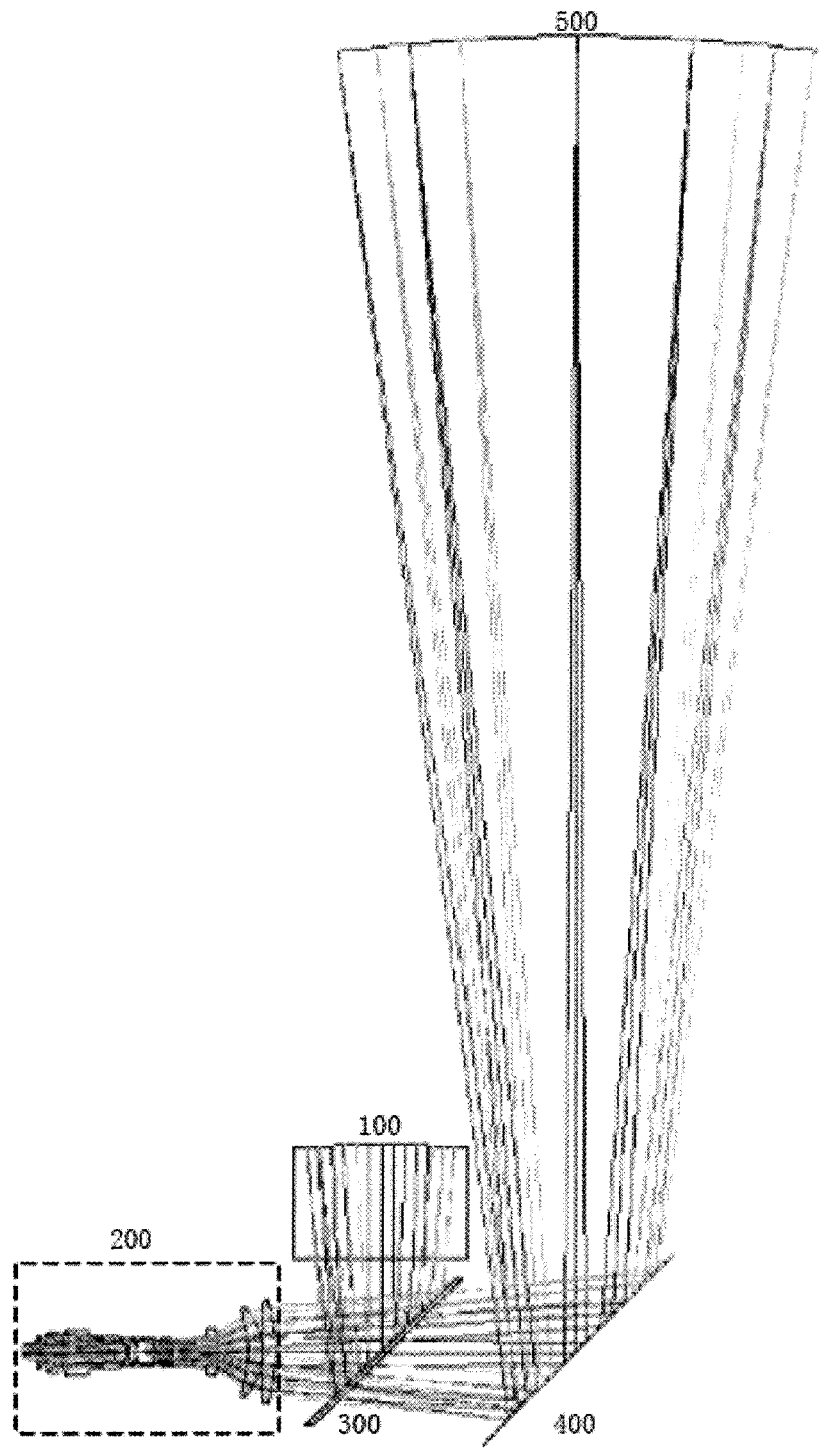
FIG. 1 is the overall optical system diagram for high-resolution broadband micro-objective lens system of the present invention.

As shown in FIG. 1, the high-resolution broadband micro-objective lens optical system of the present invention comprises a light source 100, a micro-objective lens 200, a light splitter 300 and a reflector 400. The light from light source 100 will pass through the light splitter 300 and the micro-objective lens 200 to illuminate samples to be tested. After that, samples to be tested will subject to amplification and imaging by high-resolution broadband the micro-objective lens 200 and reflection by the light splitter 300 and the reflector 400 to obtain the curved image surface 500.

Figure 2:
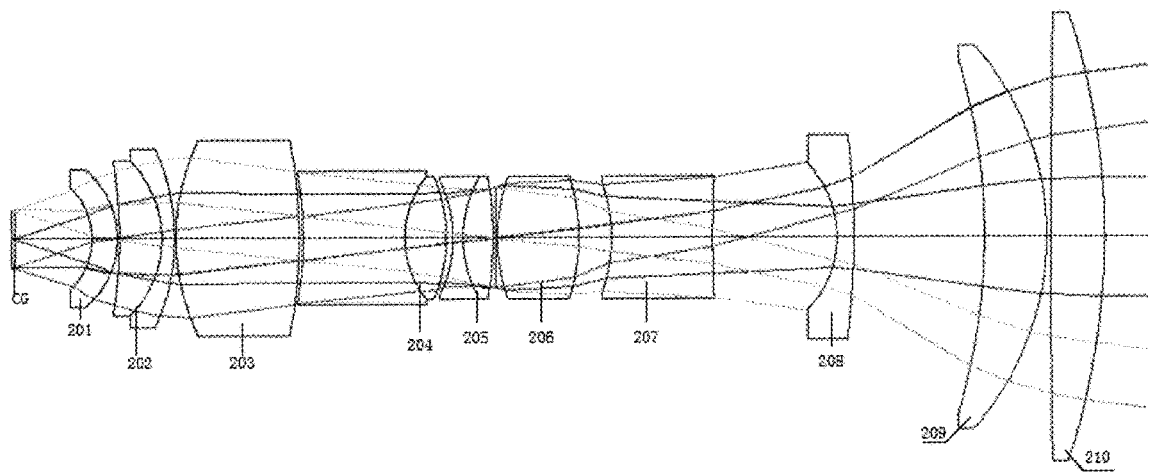
FIG. 2 is the partial optical system diagram for high-resolution broadband micro-objective lens system of the present invention.

Numerical aperture, working distance, amplification power, working wavelength of high-resolution broadband micro-objective lens is 0.3, 20 mm, 35 and 460-650 nm, respectively. As shown in FIG. 2, the micro-objective lens 200 mainly comprises the first lens group 201, the second lens group 202, the third lens group 203, the fourth lens group 204, the fifth lens group 205, the sixth lens group 206, the seventh lens group 207, the eighth lens group 208, the ninth lens group 209 and the tenth lens group 210. Such lenses aim to correct aberration to the micro-objective lens system through combination to further improve performance of the microscopic system. The second lens group 202, the fourth lens group 204 and the fifth lens group 205 belong to doublets; the second lens group is of positive-negative type; the fourth and fifth lens groups are of negative-positive type; this is favorable for obtainment of long focal distance and short working distance. Furthermore, the focal length of the third lens group, the sixth lens group, the ninth lens group and the tenth lens group is positive; whereas the focal length of the first lens group, the seventh lens group and the eighth lens group is negative. Aperture stop is located at the point 0.5 mm in front of the sixth lens group; the eighth lens group makes use of material of high Abbe dispersion characteristic to correct color difference to the broadband so as to ensure clear imaging of the micro-objective lens system within the full-wave band of 460-650 nm.

Table 1 aims to provide design results of micro-objective lens 200, including specific parameters for all lenses.

TABLE 1

Microcscope objective system

| s | r | d | nd |
|---|---|---|---|
| 1 | ∞ | 0.7 | 1.516798 |
| 2 | ∞ | 19.462 | |
| 3 | −17.039 | 6.3 | 1.846663 |
| 4 | −21.8 | 0.5 | |
| 5 | −114.485 | 10.5 | 1.846663 |
| 6 | −26.890 | 3.1 | 1.746931 |
| 7 | −52.986 | 0.3 | |
| 8 | 55.534 | 29.9 | 1.846663 |
| 9 | −122 | 1 | |
| 10 | −89 | 25 | 1.805181 |
| 11 | 24.21 | 10.4 | 1.656913 |
| 12 | −36.85 | 1.57 | |
| 13 | −32.214 | 2.5 | 1.805181 |
| 14 | 30.2 | 7.3 | 1.656913 |
| 15 | −89.77 | 0.5 | |
| 16 | ∞ | 0.5 | |
| 17 | 44.253 | 19.8 | 1.671024 |
| 18 | −50.35 | 8.12 | |
| 19 | −38.680 | 25 | 1.612934 |
| 20 | 336.84 | 30.5 | |
| 21 | −26.42 | 4 | 1.746931 |
| 22 | −222.59 | 31.92 | |
| 23 | −150.714 | 15.6 | 1.739999 |
| 24 | −69.98 | 1 | |
| 25 | 3200 | 13.25 | 1.671024 |
| 26 | −174.5 | 110 | |
| 27 | ∞ | 7 | 1.458464 |

TABLE 1-continued

Microcscope objective system

| s | r | d | nd |
|---|---|---|---|
| 28 | ∞ | 200 | |
| 29 | ∞ | 1400 | Mirror |
| 30 | 2016.62 | | |

Figure 3:
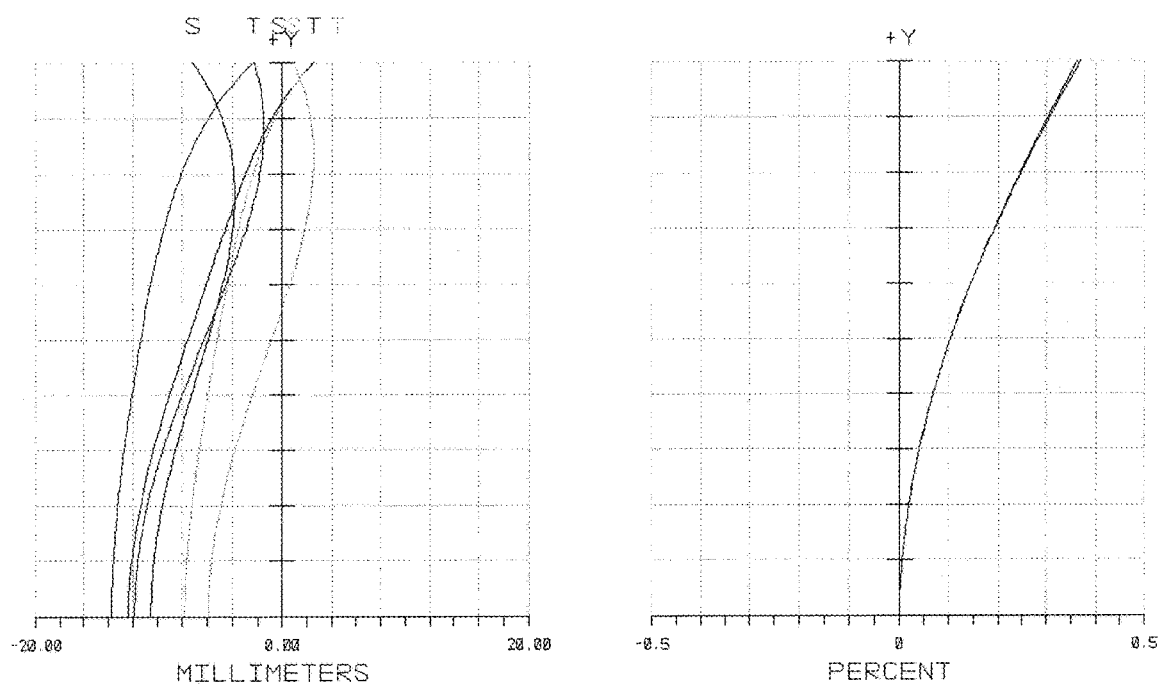
FIG. 3 is the diagram showing curvature of field and distortion curve of high-resolution broadband micro-objective lens system of the present invention.

FIG. 3 shows curvature of field and distortion to the micro-objective lens optical system of the present invention. Viewing from the figure, it can be seen that maximum optical distortion to the whole system is <0.4%.

The light splitter 300 comprises a half transparent and half reflecting lens 301 and a dichroscope 302. It is applicable to select the two light splitters according to different visible light sources and fluorescence sources for transverse shift with the help of mechanical device. Both the half transparent and half reflecting lens 301 and the dichroscope 302 form an included angle of 45° with the optical axis. The half transparent and the half reflecting lens 301 can receive full-wave band of 460-650 nm; whereas beam split wavelength of the dichroscope 302 is 555 nm.

The reflector 400 forms an included angle of 45° with the optical axis to make the light path of the system turn by 90°. The reflector 400 will not produce any aberration, which can ensure clear imaging of micro-objective lens.

The curved image 500 can effectively correct aberration to the system, especially field curvature aberration in the edge field, of which radius is R=2016 mm.

The light source 100 will pass through Kohler system, micro-objective lens 200 and light splitter 300 to illuminate samples to be tested. The illuminated samples for testing will pass through the micro-objective lens 200 to complete high-resolution broadband amplification and imaging. After that, it will subject to light split by selected half transparent and half reflecting lens 301 or the dichroscope 302 of the light splitter 300 to obtain the curved image surface 500 through reflection by the reflector 400.

The micro-object according to the present invention features in wide field and high resolution within the waveband of 460-650 nm, which can make use of curve imaging technology to provide better imaging quality for the micro-objective lens system.

What stated above are only preferred embodiments of the present invention, which are not intended to limit the present invention; any alteration, equivalent substitution and improvement as made based on the spirit and principle of the present invention will be under the protection of the present invention.

The invention claimed is:

1. A micro-objective lens, characterized in that the lens comprises a first lens group, a second lens group, a third lens group, a fourth lens group, a fifth lens group, a sixth lens group, a seventh lens group, an eighth lens group, a ninth lens group and a tenth lens group with optical axis arranged in a sequence from left to right;
the focal length of the first lens group is negative; the second lens group belongs to doublet, in which the focal length of the first and second lens is positive and negative, respectively; the focal length of the third lens group is positive; the fourth and fifth lens groups belongs to doublets, in which the focal length of the first and second lens in each group is negative and positive respectively; the focal length of the sixth lens group is positive; the focal length of the seventh and eighth lens groups is negative; the focal length of the ninth and tenth lens groups is positive.

2. The micro-objective lens according to claim 1, characterized in that it further comprises an aperture stop located at the point 0.5 mm in front of the sixth lens group.

3. A wide field of view high-resolution imaging system, characterized in that the system comprises a light source, a micro-objective lens, a spectroscope group and a reflector group; the micro-objective lens, the spectroscope group and the reflector group are on the same optical axis to form a curved image surface;

the micro-objective lens has a first lens group, a second lens group, a third lens group, a fourth lens group, a fifth lens group, a sixth lens group, a seventh lens group, an eighth lens group, a ninth lens group and a tenth lens group with optical axis arranged in a sequence from the left to the right; the focal length of the first lens group is negative; the second lens group belongs to doublet, in which the focal length of the first and second lens is positive and negative respectively; the focal length of the third lens group is positive; the fourth and fifth lens groups belongs to doublets, in which the focal length of the first and second lens in each group is negative and positive respectively; the focal length of the sixth lens group is positive; the focal length of the seventh and eighth lens groups is negative; the focal length of the ninth and tenth lens groups is positive.

4. The wide field of view high-resolution imaging system according to claim 3, characterized in that the first-fifth lens groups are in the form of combined positive lenses and doublets to obtain a long focus and a short working distance for front shifting of principal plane of the system; the sixth-tenth lens groups make use of numerous glazes of high Abbe number to correct color difference to broad band.

5. The wide field of view high-resolution imaging system according to claim 3, characterized in that magnification power of the imaging micro-objective lens is 35 with numerical aperture up to 0.3.

6. The wide field of view high-resolution imaging system according to claim 3, characterized in that the included angle between the reflecting lens group and optical axis is 45°, which enables the light path of the system to turn by 90°.

7. The wide field of view high-resolution imaging system according to claim 3, characterized in that the curved image and reflector group are located on the same optical axis, which are vertical to the optical axis where the micro-objective lens is located; radius of the curved image is 2016 mm.

8. The wide field of view high-resolution imaging system according to claim 3, characterized in that the spectroscope group comprises a half transparent and half reflecting lens and a dichroscope.

9. The wide field of view high-resolution imaging system according to claim 8, characterized in that the included angle between the half transparent and half reflecting lens and optical axis is 45°, the included angle between the dichroscope and optical axis is 45°; the two moves via the mechanical guide device.

* * * * *